(12) United States Patent
Phillips

(10) Patent No.: US 7,014,397 B2
(45) Date of Patent: Mar. 21, 2006

(54) SELF-ALIGNING HANDHELD TAPPING TOOL

(76) Inventor: Tansil Phillips, Route, Box 101A, Halls, TN (US) 38040

( * ) Notice: Subject to any disclaimer, the term of this patent is extended or adjusted under 35 U.S.C. 154(b) by 230 days.

(21) Appl. No.: 10/645,277

(22) Filed: Aug. 21, 2003

(65) Prior Publication Data
US 2005/0042046 A1  Feb. 24, 2005

(51) Int. Cl.
*B23G 5/06* (2006.01)
(52) U.S. Cl. ............ 408/239 R; 408/123; 408/222; 470/198
(58) Field of Classification Search .......... 470/198, 470/207; 408/239 R, 119, 120, 121, 122, 408/123, 122.5, 215, 222
See application file for complete search history.

(56) References Cited

U.S. PATENT DOCUMENTS

| | | | |
|---|---|---|---|
| 475,559 A * | 5/1892 | Heydenreich | 408/119 |
| 1,430,932 A * | 10/1922 | Bogstrand | 408/119 |
| 1,702,810 A * | 2/1929 | Buhr | 279/97 |
| 1,708,766 A * | 4/1929 | Lochner | 81/451 |
| 2,354,735 A * | 8/1944 | Bensinger | 408/125 |
| 3,256,541 A * | 6/1966 | Russo | 408/239 R |
| 3,727,469 A * | 4/1973 | Matthey | 74/89 |
| 4,028,763 A * | 6/1977 | Jenner | 470/103 |
| 4,514,115 A * | 4/1985 | Akashi | 408/139 |

FOREIGN PATENT DOCUMENTS

| | | | |
|---|---|---|---|
| FR | 2678534 A1 * | 1/1993 | |
| JP | 53024698 A * | 3/1978 | |

* cited by examiner

*Primary Examiner*—Boyer D. Ashley
*Assistant Examiner*—Ali Abdelwahed
(74) *Attorney, Agent, or Firm*—Wood, Phillips, Katz, Clark & Mortimer

(57) ABSTRACT

A self-aligning tapping tool comprises an elongate handle having a longitudinal counterbore through a first end. A tap is received in the counterbore. A collar is operatively secured to the tap. The collar is slightly smaller than the counterbore to enable slidable movement and to prevent rotation of the tap relative to the handle. A retainer is secured to the handled at the first end to retain the collar in the counterbore and has a center opening receiving the tap. A biasing spring in the counterbore biases the tap and the collar outwardly to extend the tap when the handle is turned to thread a hole in a work piece.

20 Claims, 6 Drawing Sheets

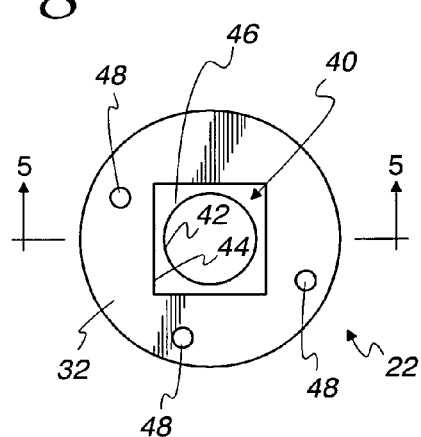
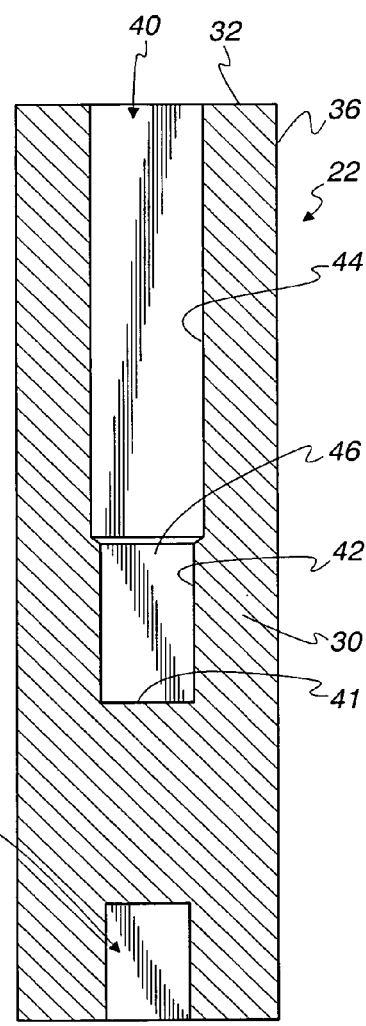
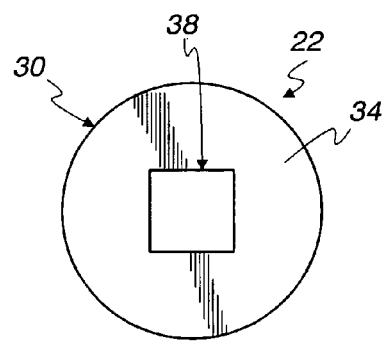

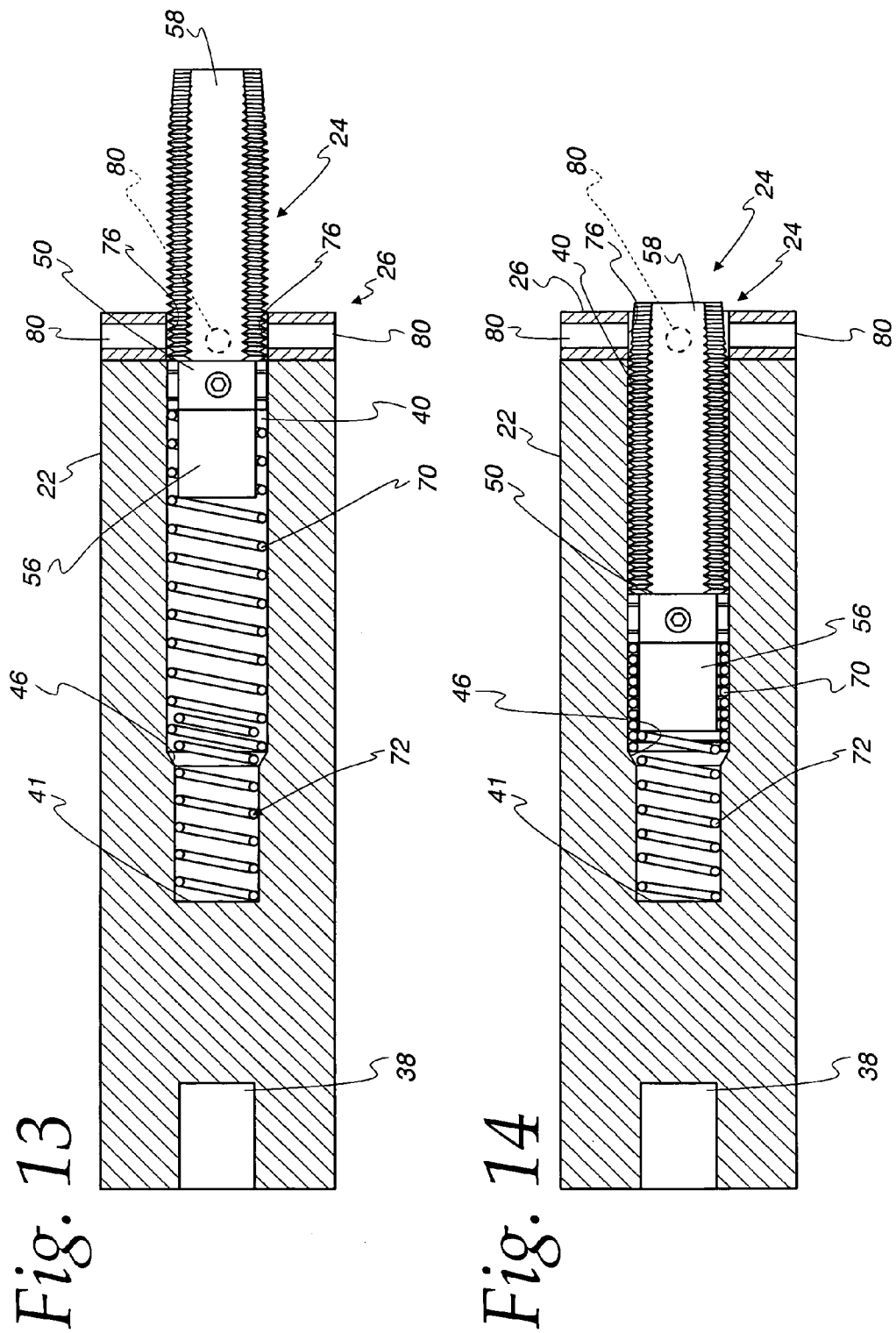

SELF-ALIGNING HANDHELD TAPPING TOOL

FIELD OF THE INVENTION

The present invention relates to repairing a threaded opening, such as with an oil pan and, more particularly, to a self-aligning tapping tool.

BACKGROUND OF THE INVENTION

In the automotive service industry an oil change is one of the more common services performed. This service comprises removing a drain plug from an oil pan. Frequently the drain plug hole becomes stripped out while removing the plug. The known repairs for a stripped drain plug holes are problematic, at best. One current repair is to insert an oversized plug into the drain plug hole. However, subsequent removal of the oversized plug can completely destroy the hole. A second alternative is to remove the oil pan for repair or replacement. Both are costly due to labor and/or parts requirements. The oil pan can be repaired by drilling and tapping the hole to be of a larger size. Conventionally, a T-bar handle is used in connection with a threaded tap which is positioned at the entrance of the hole. The T-bar handle is turned to rotate the tap to thread the hole. However, the extended length of the T-bar handle will not allow precise centering and alignment because the tap will enter at some angle when the tapping process begins.

The present invention is directed to solving one or more of the problems discussed above in a novel and simple manner.

SUMMARY OF THE INVENTION

In accordance with the invention, there is provided a self-aligning tapping tool.

Broadly, the tapping tool comprises an elongate handle having a longitudinal counterbore through a first end. A tap is received in the counterbore. A collar is operatively secured to the tap. The collar is slightly smaller than the counterbore to enable slidable movement and to prevent rotation of the tap relative to the handle. A retainer is secured to the handled at the first end to retain and the collar in the counterbore and has a center opening receiving the tap. A biasing means in the counterbore biases the tap and the collar outwardly to extend the tap when the handle is turned to thread a hole in a workpiece.

It is a feature of the invention that the handle further comprises a slot at a second end for receiving a drive tool.

It is another feature of the invention that the collar has a flatted outer side engaging a counterbore flatted side. The collar may comprise a square collar and the counterbore may have a square cross section.

It is another feature of the invention that the collar is secured to the tap with screws that lock in flutes of the tap.

It is still another feature of the invention that the retainer comprises an annular retainer having a plurality of radial through openings receiving guide screws extending into flutes of the tap.

It is yet another feature of the invention that the biasing means comprises a spring acting on the collar. A second spring acts on an inner end of the tap. The counterbore may comprise a shoulder defining an inner seat for the first spring.

There is disclosed in accordance with another aspect of the invention a self-aligning handheld tool comprising an elongate cylindrical handle having a longitudinal, rectangular counterbore through a first end and a slot at a second end for receiving a drive tool. A tap is received in the counterbore. A rectangular collar is operatively secured to the tap. The collar is slightly smaller than the counterbore to enable slidable movement and to prevent rotation of the tap relative to the handle. An annular retainer is secured to the handle at the first end to retain the collar in the counterbore and has a central opening receiving the tap. Biasing means in the counterbore bias the tap and the collar outwardly to extend the tap when the handle is turned to thread a hole in a workpiece.

Further features and advantages of the invention will be readily apparent from the specification and from the drawings.

BRIEF DESCRIPTION OF THE DRAWINGS

FIG. 4 is a bottom plan view of a handle of the tool of FIG. 1;

FIG. 5 is a sectional view taken along the line 5—5 of FIG. 4;

FIG. 6 is a top plan view of the handle of FIG. 4;

FIG. 13 is a partial sectional view of the tool of FIG. 1 with the tap in an extended position;

FIG. 14 is a view similar to that of FIG. 13 with the tap in a retracted position.

DETAILED DESCRIPTION OF THE INVENTION

Figure 1:
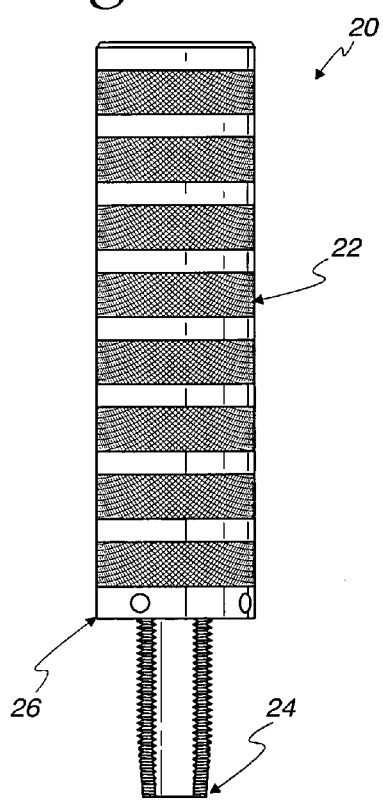
FIG. 1 is a side perspective view of a self-aligning handheld tapping tool in accordance with the invention with a tap in an extended position.

Referring initially to FIG. 1, a self-aligning handheld tapping tool 20 according to the invention is illustrated. The tool 20 is adapted for repairing stripped oil pan drain plug holes in a variety of vehicles while the oil pan remains on the vehicle. The tool 20 achieves and maintains centering and alignment while tapping a drilled hole either in a flat or rounded surface. The process requires only one hand for the complete operation.

While the tool is described with respect to tapping an oil pan drain plug hole, the tool 20 could be used for tapping any type hole, as will be readily apparent.

Figure 2:
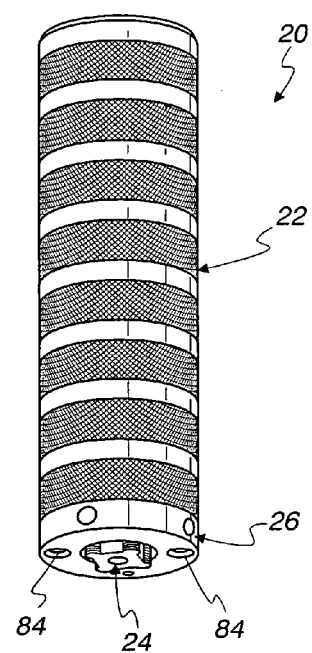
FIG. 2 is a perspective view, similar to FIG. 1, with the tap in a retracted position.
Figure 3:
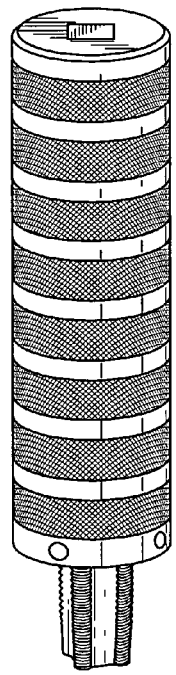
FIG. 3 is a top perspective view of the tool of FIG. 1 illustrating a drive slot.

The tool 20 comprises an elongate handle 22 receiving a slidable tap 24 held in place by a retainer 26. FIG. 1 illustrates the tap 24 in an extended position. FIG. 2 illustrates the tap 24 in a retracted position. As described more particularly below, when the tool 20 is placed against a flat surface having a hole to be tapped, the tap 24 is retracted, as shown in FIG. 2. The handle 22 is rotated to turn the tap 24 to tap the hole with the tap 24 gradually extending, as described below.

Referring to FIGS. 4–6, the handle 22 comprises an elongate cylindrical body 30 having a first end 32 and an opposite second end 34. The body 30 has a knurled outer surface 36. A square-shaped slot 38 is milled at the second end 34 for receiving a ratchet tool. A longitudinal counterbore 40 is provided through the first end 32 and having an inner end wall 41. The counterbore 40 comprises a first, circular counterbore 42. A second, square-shaped counterbore 44 is milled or otherwise formed coaxial with the first counterbore 42 and is larger in size to define a shoulder 46.

In the illustrated embodiment of the invention, the handle has a length of about 4.5 inches and a diameter of about 1.25 inches. The handle 22 may be formed of aluminum. The first counterbore 42 has a diameter of about ½ inch and a depth of about 3 inches. The second counterbore 44 is square-shaped in cross section having sides on the order of 0.630 inches and has a depth of just over 2 inches. Three screw openings 48 are provided in the first end 32, see FIG. 4, for securing the retainer 26, as described below.

Figure 7:
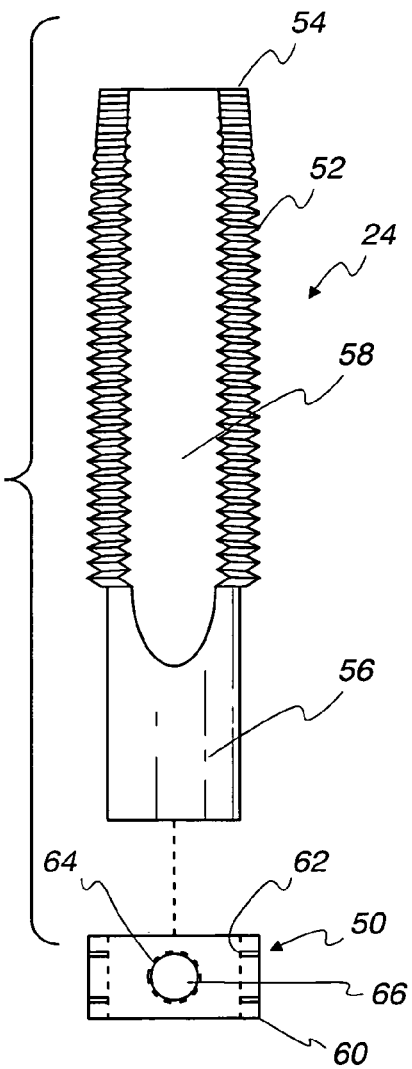
FIG. 7 is an exploded view of a tap and collar of the tool of FIG. 1.
Figure 8:
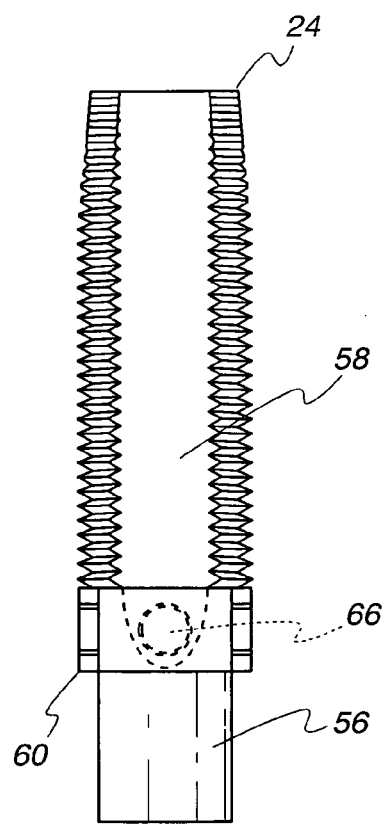
FIG. 8 is a side elevation view illustrating the assembled tap and collar of FIG. 7.

Referring to FIGS. 7 and 8, the tap 24 is of conventional construction and is operatively associated with a collar 50. The tap 24 is generally cylindrical and includes a threaded portion 52 gradually narrowing to an outer end 54 and having an inner shank end 56. Four flutes 58 are provided radially spaced about the threaded wall 52 for removal of metal shavings or the like. The flutes 58 extend slightly into the shank end 56.

The collar 50 comprises a square-shape body 60 having a circular axial through opening 62 for receiving the shank 56. Four openings 64 are provided around the periphery of the block 60 for receiving #5 Allen head screws 66 that lock in the flutes 58, as generally illustrated in FIG. 8. The collar 60 is machined to about 0.6250 inches square and fits into the 0.630 square counterbore 44. Particularly, the tap 24 is slidably received in the counterbore 44. The flatted surfaces of the collar 60, provided by its square shape, relative to the flatted surface of the second counterbore 44, also provided by its square shape, enables slidable movement and prevents rotation of the tap 24 relative to the handle 22.

Figure 9:
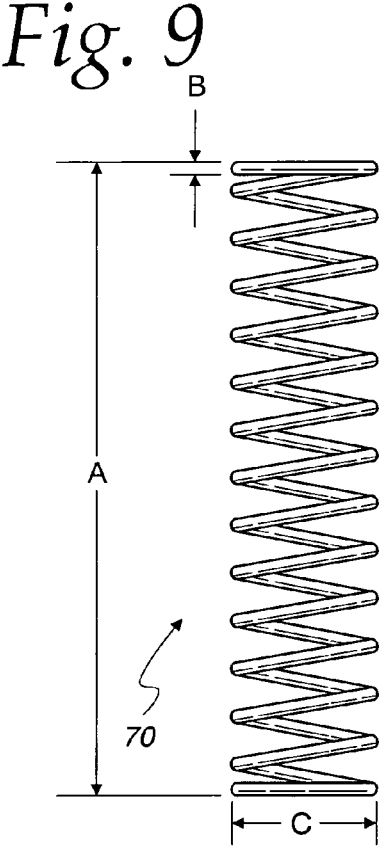
FIG. 9 is an elevation view of a positioning spring of the tool of FIG. 1.

Referring to FIG. 9, a positioning or collar spring 70 is illustrated. The spring A has a length A of about 2.75 inches, a wire thickness B of about 0.057 inches and diameter C of about 0.614 inches.

Figure 10:
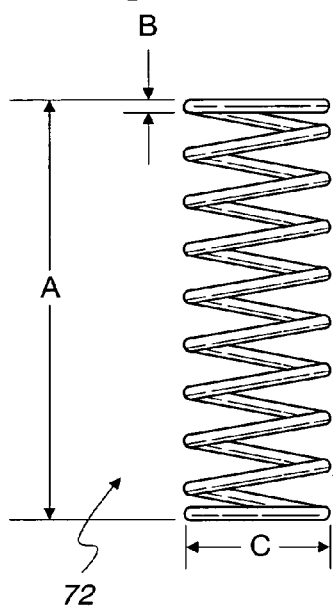
FIG. 10 is a side elevation view of a tap spring of the tool of FIG. 1.

FIG. 10 illustrates a tap spring 72 having a length A of about 1.625 inches, a wire size B of about 0.062 inches and a diameter C of about 0.49 inches.

Figure 11:
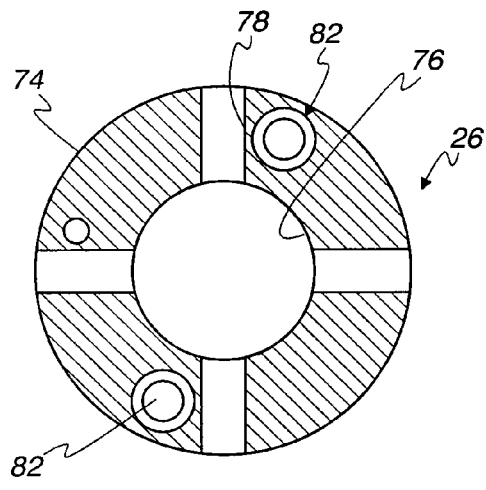
FIG. 11 is a plan view of a retainer of the tool of FIG. 1.
Figure 12:
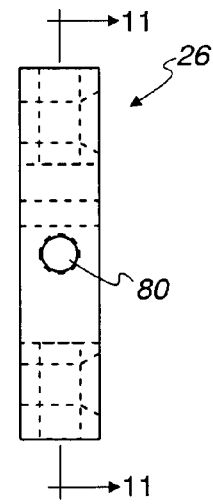
FIG. 12 is a side elevation view of the retainer of FIG. 11.

Referring to FIGS. 11 and 12, the retainer 26 comprises an aluminum annular element 74 having a circular central through opening 36 surrounded by radially extending threaded through openings 78 each for receiving an Allen head screw 80. A pair of openings 82 are provided parallel with the central through openings 76 for receiving fasteners 84, see FIG. 2, receivable in the openings 48, see FIG. 4, for securing the retainer 26 to the handle 22. The holes 78 are aligned with the tap flutes 58. Particularly, an Allen screw 80 in each of the openings 78 extends into one of the flutes 58 to achieve complete alignment of the tap 24. Particularly, the set screws 80 are turned to contact all four flutes 58 at the same position. Once these screws 80 are set and locked the tap 24 is fully aligned at either its fully extended length or its fully retracted position. The tap 24 is then aligned and moves freely throughout the tool handle 22 during the threading process.

The assembled tool 20 is illustrated in greater detail in FIGS. 13 and 14. FIG. 13 illustrates the tap 24 in the extended position. FIG. 14 illustrates the tap 24 in the retracted position.

As illustrated, the retainer 26 is secured to the handle 22 with the screws 84, see FIG. 2, to retain the collar 50 in the counterbore 40. The tap 24 extends through the central opening 76. The collar spring 70 extends between the shoulder 46 and the collar 50. The tap spring 72 extends between the counterbore end wall 41 and selectively engages the tap shank 56. The springs 70 and 72 effectively bias the tap 24 outwardly. As is conventional, the tap 24 gradually extends during a tapping operation and in the illustrated embodiment of the invention extends with the aid of the springs 70 and 72 when the handle 22 is turned to thread a hole in a workpiece. Particularly, the two springs 70 and 72 comprise compression springs. The collar springs 70 exerts about 7.6 pounds per square inch. The tap spring 72 exerts about 9.8 pounds per square inch. As the tap 24 is pressed into the tool handle 22 for approximately one inch it has little resistance because the collar spring 70 acts only as a positioning spring. As the tap 24 compresses and is within ½ inch of its fully retracted spring, the tap spring 72 begins to compress. The tap spring 72 has more resistance as it is engaged. The tap spring 72 maintains a consistent force against the tap 24 forcing its end into a drilled hole, in use. Once the force of the tap spring 72 is felt, the tool handle 22 is completely pushed down causing the tap 24 to retract fully into the tool handle 22, as illustrated in FIG. 14. At that time the tool handle body with its flat retaining guide 26 matches a flat surface of a workpiece. As is apparent, if the workpiece is round, it still retains a flat surface on its radius.

Figure 15A:
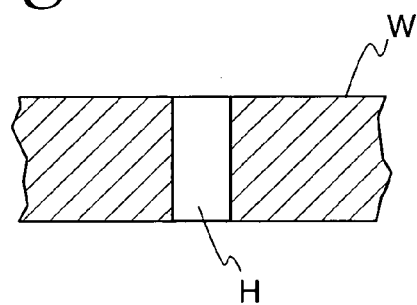
FIGS. 15A–15D illustrate use and operation of the tool of FIG. 1 for drilling and tapping a hole in a work piece.
Figure 15B:
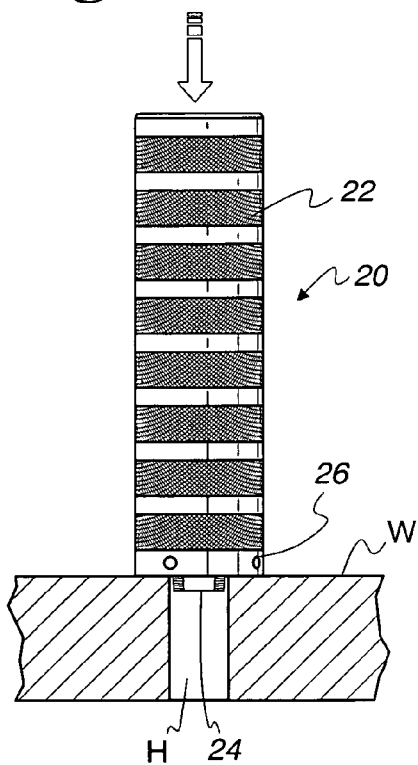
Figure 15C:
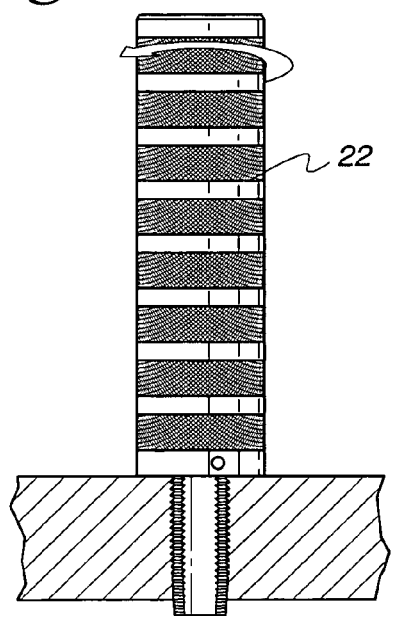
Figure 15D:
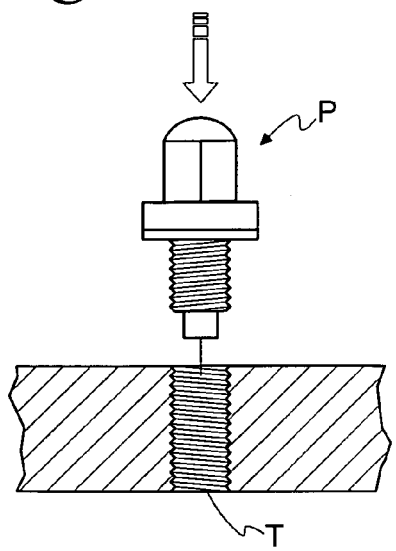

Use of the tool 22 for tapping a hole is illustrated in FIGS. 15A–15D. Particularly, FIG. 15A illustrates a workpiece W having a drilled hole H. For example, the workpiece W could be an oil pan. If a drain plug hole is stripped, then a conventional drill bit can be used to drill a clean hole, such as the hole H shown in FIG. 15A. The tool 20 is then positioned, as described above, against the workpiece W with the tap 24 retracted, as shown in FIG. 15B. In this position, owing to the taper of the tap 24, the distal end of the tap 24 will extend slightly into the hole H. The handle 22 is then rotated, as illustrated by the arrow in FIG. 15C, such as with a ratchet tool. As the tap 24 begins to form a thread in the hole, and aided by the force of the springs 70 and 72, the tap 24 extends as the handle 22 is turned until it reaches its fully extended position, shown in FIG. 15C. The flat surface of the retainer 26 against the flat surface of the workpiece W provides centering and alignment of the tap 24. Moreover, the square-shaped counterbore 44 in combination with the square-shaped collar 50 acts as a slide track for the tap 24 and allows it to travel in and out with ease while maintaining alignment. Likewise, the retainer guide set screws 80 extending into the tap flutes 58 further provide alignment throughout the tapping process.

The dimensions given herein and above are intended to be exemplary. Advantageously, the tool 20 can be provided as part of a kit. The kit would comprise the handle 22 and springs 70 and 72. Multiple size taps 24 and associated collars 50 could be provided each associated with a retainer 26. The kit could also have multiple size drill bits and drain plugs or the like. In use, the mechanic using the kit can determine the size of the opening necessary and use the drill bit to clean out the opening and then select the appropriate size tap and drain plug to tap the hole and provide suitable repair. The use of the described tool 20 can shorten the repair time to about 5 minutes which can save as much as hundreds of dollars from conventional repairs.

Thus, in accordance with the invention, there is provided a self-aligning handheld tapping tool for simply and readily tapping an opening, such as in a vehicle oil pan.

I claim:

1. A self-aligning tapping tool comprising:
   an elongate handle having a longitudinal counterbore through a first end;
   a tap received in the counterbore;
   a collar operatively secured to the tap, the collar being slightly smaller than the counterbore to enable slidable movement and to prevent rotation of the tap relative to the handle;
   a retainer secured to the handle at the first end to retain the collar in the counterbore and having a central opening receiving the tap; and
   biasing means in the counterbore for biasing the tap and the collar outwardly to extend the tap when the handle is turned to thread an opening in a workpiece.

2. The self-aligning tapping tool of claim 1 wherein the handle further comprises a slot at a second end for receiving a drive tool.

3. The self-aligning tapping tool of claim 1 wherein the collar has a flatted outer side engaging a counterbore flatted side.

4. The self-aligning tapping tool of claim 1 wherein the collar comprises a square collar and the counterbore has a square cross section.

5. The self-aligning tapping tool of claim 1 wherein the collar is secured to the tap with screws that lock in flutes of the tap.

6. The self-aligning tapping tool of claim 1 wherein the retainer comprises an annular retainer having a plurality of radial through openings receiving guide screws extending into flutes of the tap.

7. The self-aligning tapping tool of claim 1 wherein the biasing means comprises a spring acting on the collar.

8. The self-aligning tapping tool of claim 1 wherein the biasing means comprises a spring acting on an inner end of the tap.

9. The self-aligning tapping tool of claim 1 wherein the biasing means comprises a first spring acting on the collar and a second spring, received in the first spring, acting on the tap.

10. The self-aligning tapping tool of claim 9 wherein the counterbore comprises a shoulder defining an inner seat for the first spring.

11. A self-aligning handheld tapping tool comprising:
    an elongate cylindrical handle having a longitudinal, rectangular counterbore through a first end and a slot at a second end for receiving a drive tool;
    a tap received in the counterbore;
    a rectangular collar operatively secured to the tap, the collar being slightly smaller than the counterbore to enable slidable movement and to prevent rotation of the tap relative to the handle;
    an annular retainer secured to the handle at the first end to retain the collar in the counterbore and having a central opening receiving the tap; and
    biasing means in the counterbore for biasing the tap and the collar outwardly to extend the tap when the handle is turned to thread an opening in a workpiece.

12. The self-aligning handheld tapping tool of claim 11 wherein the slot is square shaped for receiving a ratchet device.

13. The self-aligning handheld tapping tool of claim 11 wherein the retainer has a flat end surface for engaging a workpiece.

14. The self-aligning handheld tapping tool of claim 11 wherein the collar comprises a square collar and the counterbore has a square cross section.

15. The self-aligning handheld tapping tool of claim 11 wherein the collar is secured to the tap with screws that lock in flutes of the tap.

16. The self-aligning handheld tapping tool of claim 11 wherein the retainer has a plurality of radial through openings receiving guide screws extending into flutes of the tap.

17. The self-aligning handheld tapping tool of claim 11 wherein the biasing means comprises a spring acting on the collar.

18. The self-aligning handheld tapping tool of claim 11 wherein the biasing means comprises a spring acting on an inner end of the tap.

19. The self-aligning handheld tapping tool of claim 11 wherein the biasing means comprises a first spring acting on the collar and a second spring, received in the first spring, acting on the tap.

20. The self-aligning handheld tapping tool of claim 19 wherein the counterbore comprises a shoulder defining an inner seat for the first spring.

* * * * *